No. 703,490. Patented July 1, 1902.
M. O. SMITH.
STORAGE BATTERY.
(Application filed July 18, 1901.)
(No Model.)
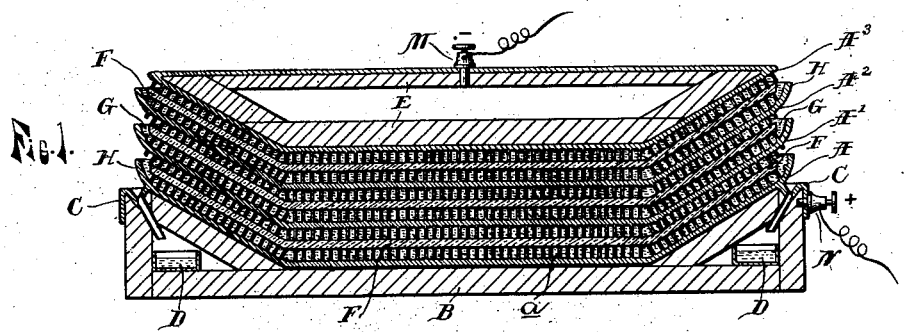
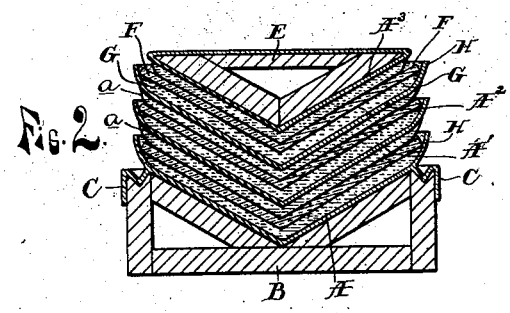
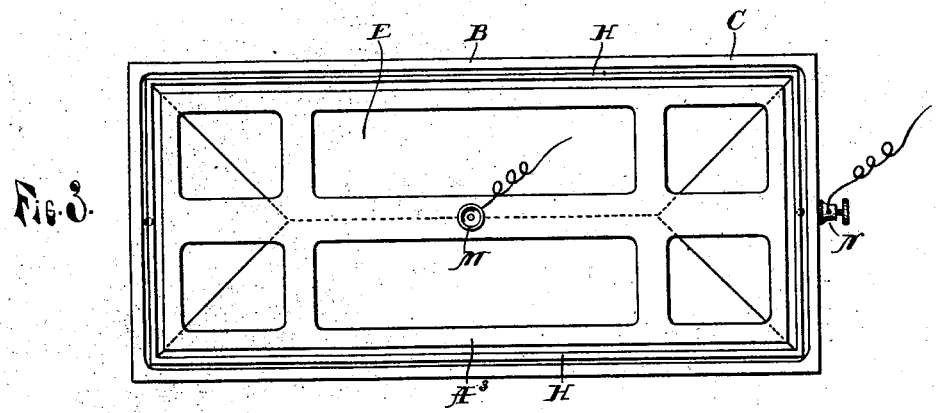
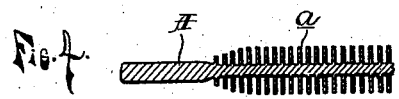
WITNESSES.
L. E. Flanders
Joseph A. Noelke
INVENTOR.
Malcom O. Smith
By
Attorneys.

UNITED STATES PATENT OFFICE.

MALCON O. SMITH, OF DEPEW, NEW YORK, ASSIGNOR OF ONE-HALF TO THOMAS J. COSTER, OF DEPEW, NEW YORK.

STORAGE BATTERY.

SPECIFICATION forming part of Letters Patent No. 703,490, dated July 1, 1902.

Application filed July 13, 1901. Serial No. 68,145. (No model.)

*To all whom it may concern:*

Be it known that I, MALCON O. SMITH, a citizen of the United States of America, residing at Depew, in the county of Erie and State of New York, have invented certain new and useful Improvements in Storage Batteries, of which the following is a specification, reference being had therein to the accompanying drawings.

My invention relates to secondary or storage batteries; and it consists, essentially, in the peculiar and novel construction, arrangement, and combination into a storage battery of tray-like elements having electrodes formed on opposite sides in integral conductive connection with the plates, all as more fully described hereinafter and shown in the accompanying drawings, in which—

Figure 1 is a longitudinal section of my improved battery. Fig. 2 is a transverse section thereof. Fig. 3 is a plan view of battery. Fig. 4 is an enlarged section of a portion of one of the intermediate plates.

A A' A² A³ represent a series of superposed metallic plates made in the form of trays with outwardly-sloping sides and ends, making the bottom of the trays along a central longitudinal line. These trays contain the electrolyte and divide the battery into a series of cells, each cell containing a positive and a negative electrode, the positive electrode being formed on one side of the plates and the negative one on the other side thereof, the end plates, which have but one electrode, forming the poles of the battery, while the intermediate plates, which have electrodes on both sides, electrically connect the cells. To this end the trays are made of lead or its equivalent and have a supporting-grid for the active material formed thereon integrally with the body of the tray and adapted to hold the electrode in conductive connection therewith. This grid I preferably form by plowing the faces of the plate within the outer marginal portion with a suitable cutting-tool, thereby transforming it into thin laminæ *a*, which are vertically disposed, their inner ends remaining united to a core in the center of the plate. The intermediate trays are formed with grids of this character upon both the upper and lower sides, while the end trays are formed with the grid on one side only.

The trays are supported on a non-conducting rack B, into which the bottom tray fits and in which it is secured by means of a guttered flange C, formed on the edge of the tray and adapted to catch all drippings from the trays and conduct them into a trough D, concealed in the supporting-rack.

The top tray A³ is made into a follower or cover by reinforcing it with a frame E, of wood or other suitable material, fitted into the tray, and the edges are extended over said frame to form a metallic contact on top of the cover.

The trays are acid-tight and are supported one upon the other by non-conducting porous separator-plates F, interposed between the trays. These separators hold the trays out of all metallic contact with each other, but provide electric connection between the plates by means of a suitable electrolyte G, supplied into the trays to a depth necessary to submerge the active surfaces thereof, each tray containing the electrolyte being formed with an upturned edge H along its outer edges.

The electrodes of the trays may be formed by any of the known processes alike in all the trays, so that if the battery is charged each intermediate tray has the positive electrode on the one side and the negative electrode on the other side, the bottom and top plates, respectively, forming the opposite poles of the battery, to which the binding-posts are secured to receive the terminals of the circuit of the battery.

The separators may be made of any suitable acid-proof non-conducting material fashioned on the same shape as the metallic trays, and the material may be either of a porous or absorbing nature or be suitably perforated to permit the passage of the electrolyte.

Having now fully described my construction, I will point out different advantages which my construction possesses.

First. There are no metallic connections to be made between the elements, as the trays themselves are the conductors between the positive and negative elements, and there is no trouble from imperfect, burned-out, or worn-out connections, the battery-wires being also directly secured to the end plates by binding-posts M and N, one on the cover and the other on the flange C of the lower tray.

Second. The voltage of the battery and correspondingly its ampere capacity can be increased in the most simple manner by simply lifting off the cover, adding a new tray or trays with the necessary separators, and again replacing the cover.

Third. Each tray is acid-tight, and as all the parts in contact with the electrolyte are sloping outwardly in an upward direction the gas will find ready escape.

Fourth. The buckling or warping of the plates, which in my experience results from imperfect connections which hamper and resist the passage of the current, is prevented by my construction, in which the full surface of the submerged cells forms the conductor. Consequently there is no internal electromotive force to affect the plates.

Fifth. If a tray should become leaky, it can be easily detected, and it is a very simple operation to take it out and put a new one in its place.

Sixth. The construction of the trays provides for large active surfaces in proportion to the weight and all in a very compact form, occupying but little space and making the battery therefor of especial value for automobile and like use.

What I claim as my invention is—

1. An element for storage battery, composed of a metallic plate forming a tray with outwardly-sloping sides and ends, deepest in the center along a central longitudinal line, said plate provided upon its upper and lower sides with electrodes of opposing polarity, in conductive connection with the plate by means of a retaining-grid of vertically-disposed thin laminæ, formed from the body of the plate on opposite sides of its central core to which said laminæ remain united, the outer or marginal portion of the tray being formed by intact portions of the plate and bent upwardly to form a standing rim around the edge of the tray.

2. A storage battery, composed of an alternating series of conducting and non-conducting tray-shaped plates, nested together in a vertical pile, the conducting-plates adapted to contain an electrolyte and provided with electrodes in conductive connection with the plates, and the non-conducting plates of porous material retaining the electrodes out of contact with each other, and an electrolyte in which the non-conducting plates are immersed for electrically connecting the electrodes, a supporting-rack of non-conducting material having a tray-shaped depression in which the bottom tray fits and upon which the pile is supported, and a follower formed of the top tray by means of a stiffening-frame, said top tray formed upon its under side only with an electrode and constituting one pole of the battery, and the bottom tray formed upon its upper side only with an electrode constituting the other pole of the battery.

3. A storage battery, composed of an alternating series of conducting and non-conducting tray-shaped plates nested together in a vertical pile, the conducting-plates being acid-tight and provided with electrodes formed in conductive connection with the plates, and the non-conducting plates of porous material, interposed between the electrodes of the conducting-plates, and an electrolyte in which the non-conducting plates are immersed for electrically connecting the electrodes, a supporting-rack of non-conducting material formed with a tray-shaped depression in which the bottom tray is supported, a guttered flange around said bottom tray and supported upon the walls of the supporting-rack, an overflow vessel contained within the supporting-rack and communicating with the gutter, and a follower or cover formed of the top tray by means of a stiffening-frame within the tray, the edges of said top tray extending over the top of said frame and forming one terminal of the battery, and the guttered flange of the bottom tray forming the other terminal.

4. A storage battery, composed of conducting and non-conducting tray-shaped plates nested in the form of a vertical pile, and a supporting-base formed with a tray-shaped depression in which the pile is supported, the non-conducting plates of porous material interposed between the conducting-plates, and the conducting-plates adapted to contain an electrolyte and provided with electrodes in conductive connection therewith, the intermediate plates having electrodes upon both their upper and lower sides, and the top and bottom plates upon their lower and upper sides only, and forming the terminals of the battery.

5. A storage battery, composed of conducting and non-conducting tray-shaped plates nested in the form of a vertical pile, a supporting-rack having a like tray-shaped depression upon which the pile is supported as a base, and a cover on top of the pile, the non-conducting plates of porous material interposed between the conducting-plates and containing the electrolyte, and the conducting-plates provided with electrodes in conductive connection with the plates, the intermediate plates provided with electrodes upon their upper and lower sides, and the bottom and top plates upon one side only and constituting the terminals of the battery, said top plate formed into a rigid follower or cover by means of a stiffening-frame inclosed within the plate.

6. A storage battery, constructed in the form of a pile and composed of nested tray-shaped conducting-plates adapted to contain the electrolyte and provided with electrodes in direct conductive connection therewith, non-conducting tray-shaped porous plates interposed between the conducting-plates immersed in the electrolyte therein, an insulating-base supporting the pile and having a tray-shaped depression to receive the bottom tray of the pile, a guttered flange on said bottom tray extending around the top of the base in position to receive the overflow from the trays, an overflow vessel contained within the base and communicating with said gutter, and a follower or cover composed of the conducting plate or tray on top of the pile and a stiffening-frame inside said tray.

In testimony whereof I affix my signature in presence of two witnesses.

MALCON O. SMITH.

Witnesses:
 THOS. J. COSTER,
 JOHN LEININGER.